Nov. 27, 1951 X. F. CASTELLI 2,576,570
SCREW MACHINE
Filed Jan. 8, 1946 15 Sheets-Sheet 1
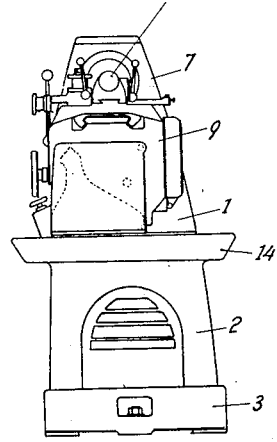
Fig:2
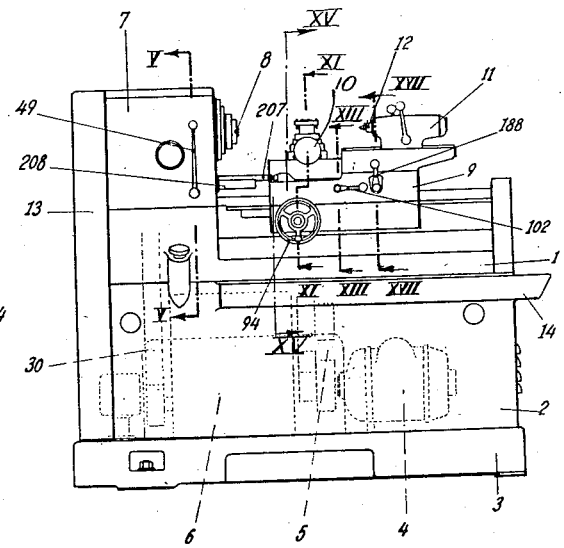
Fig:1
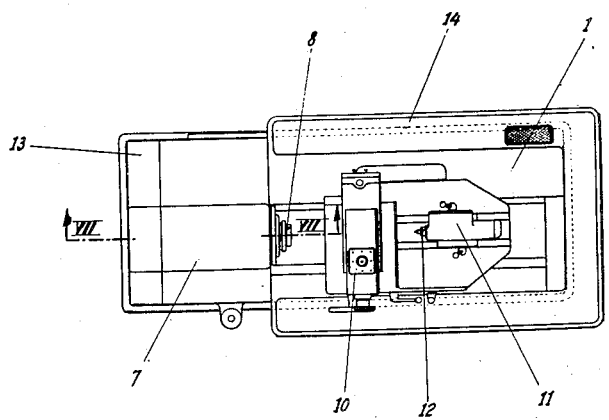
Fig:3
Inventor
Xavier F. Castelli
by Malcolm W. Fraser
attorney

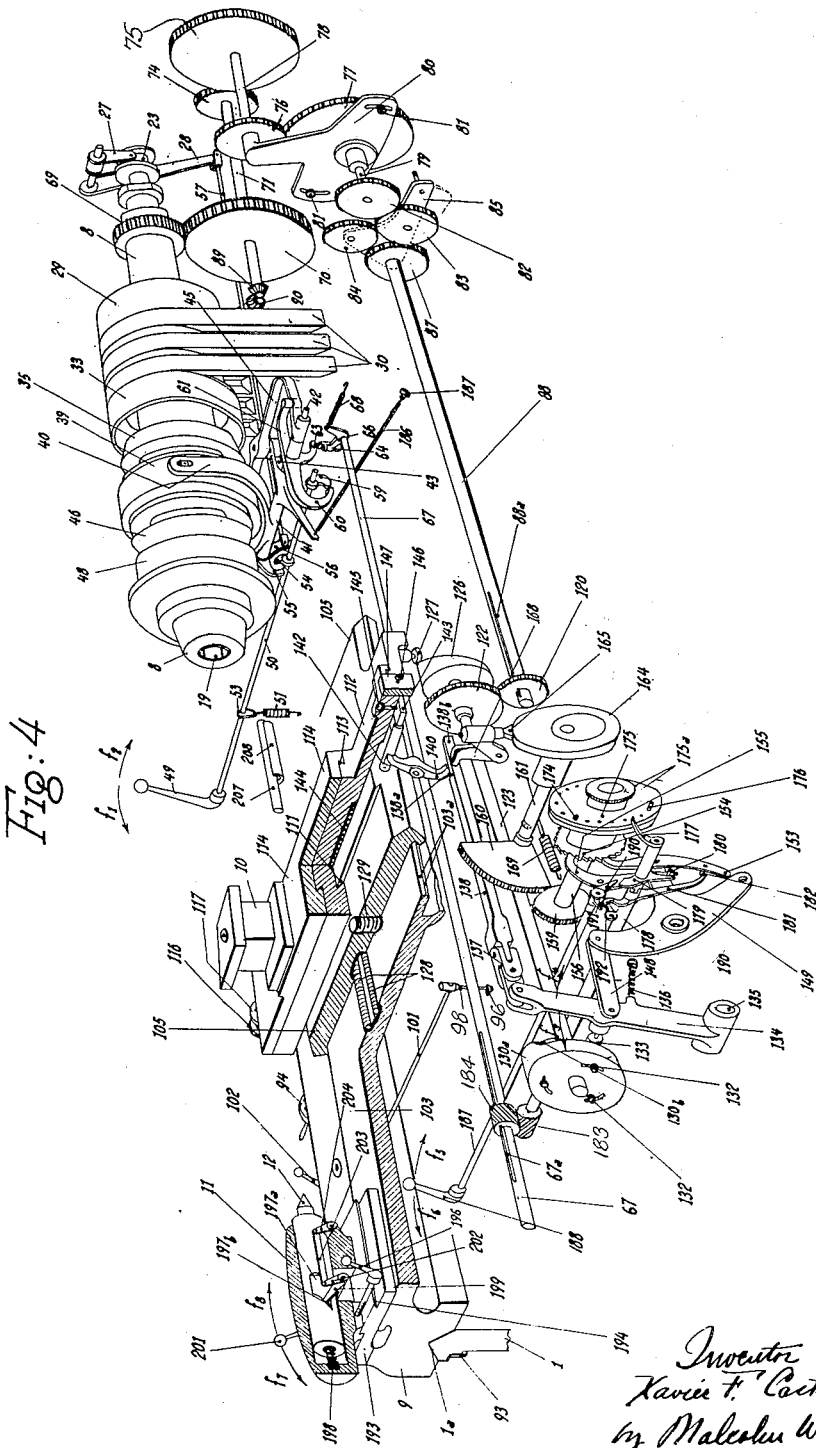

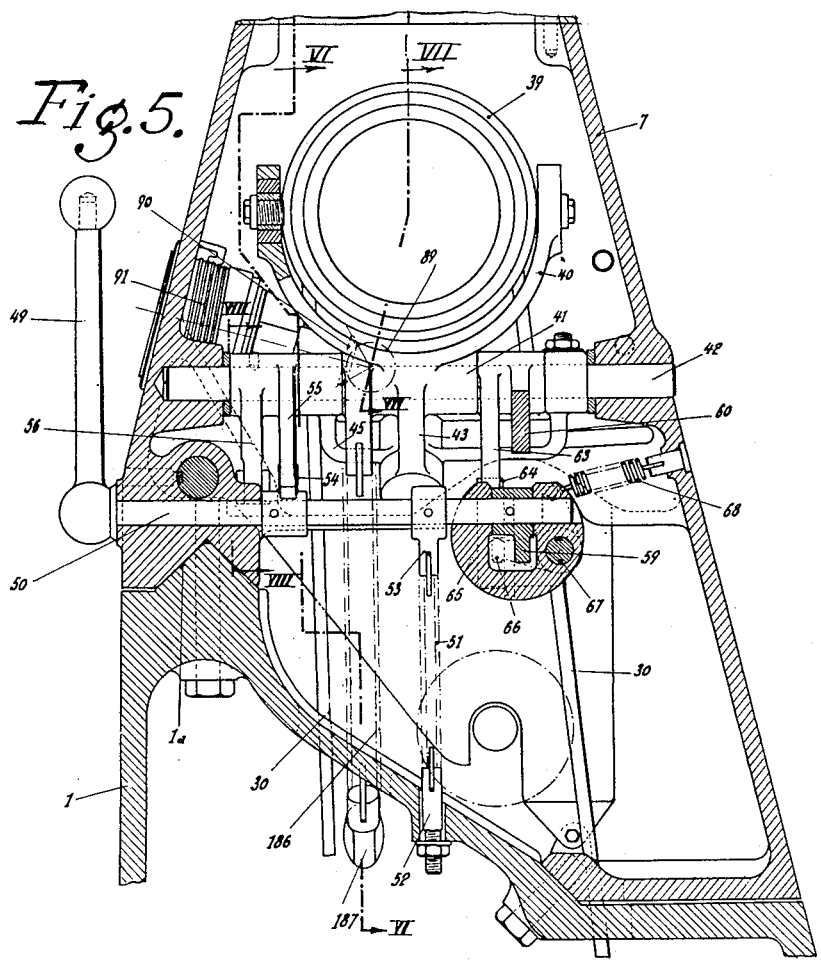
Fig.5.
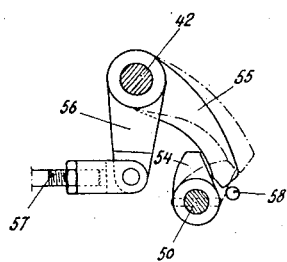
Fig:8

Nov. 27, 1951  X. F. CASTELLI  2,576,570
SCREW MACHINE
Filed Jan. 8, 1946  15 Sheets-Sheet 4
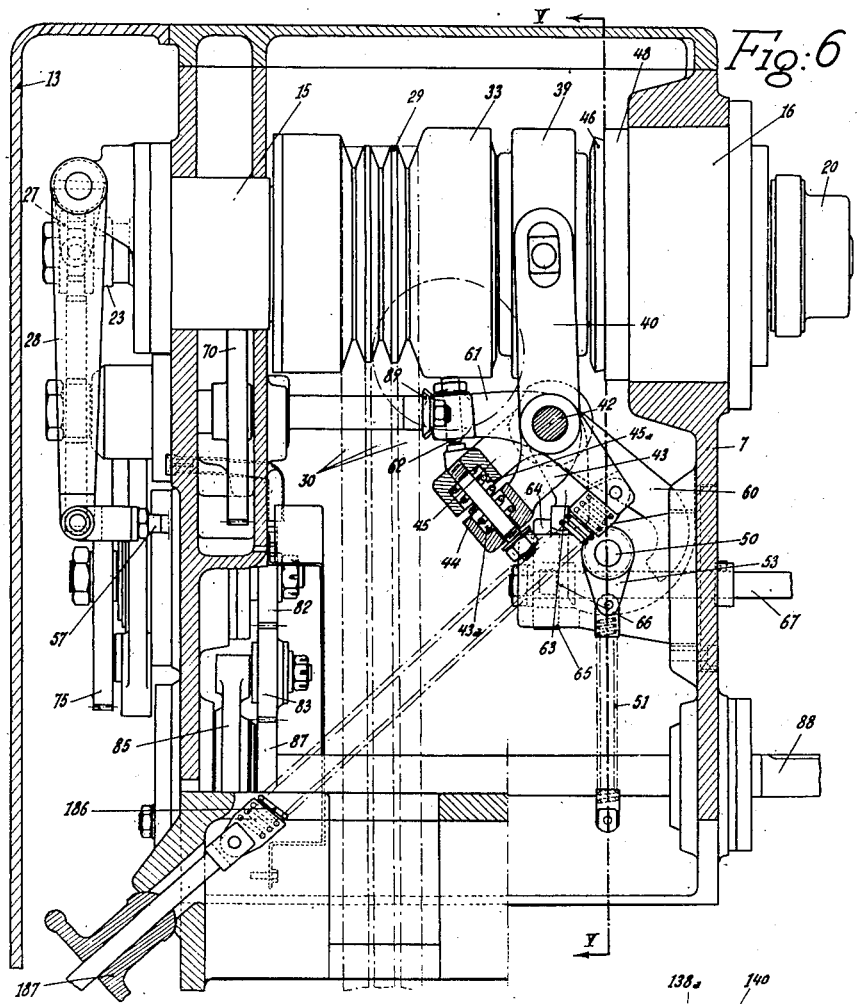
Fig:6
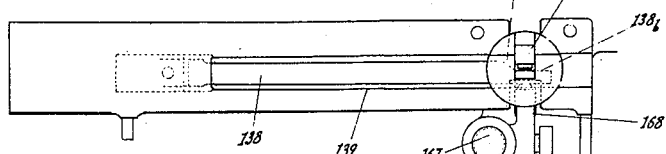
Fig:22
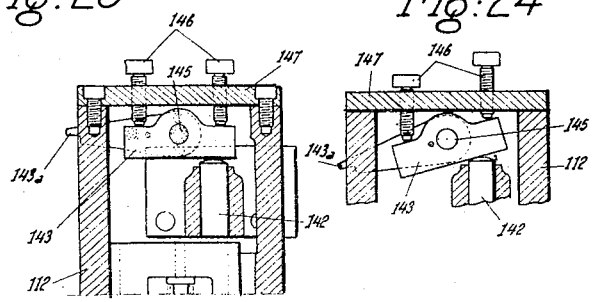
Fig:23  Fig:24
Inventor
Xavier F. Castelli
by Malcolm W. Fraser
Attorney

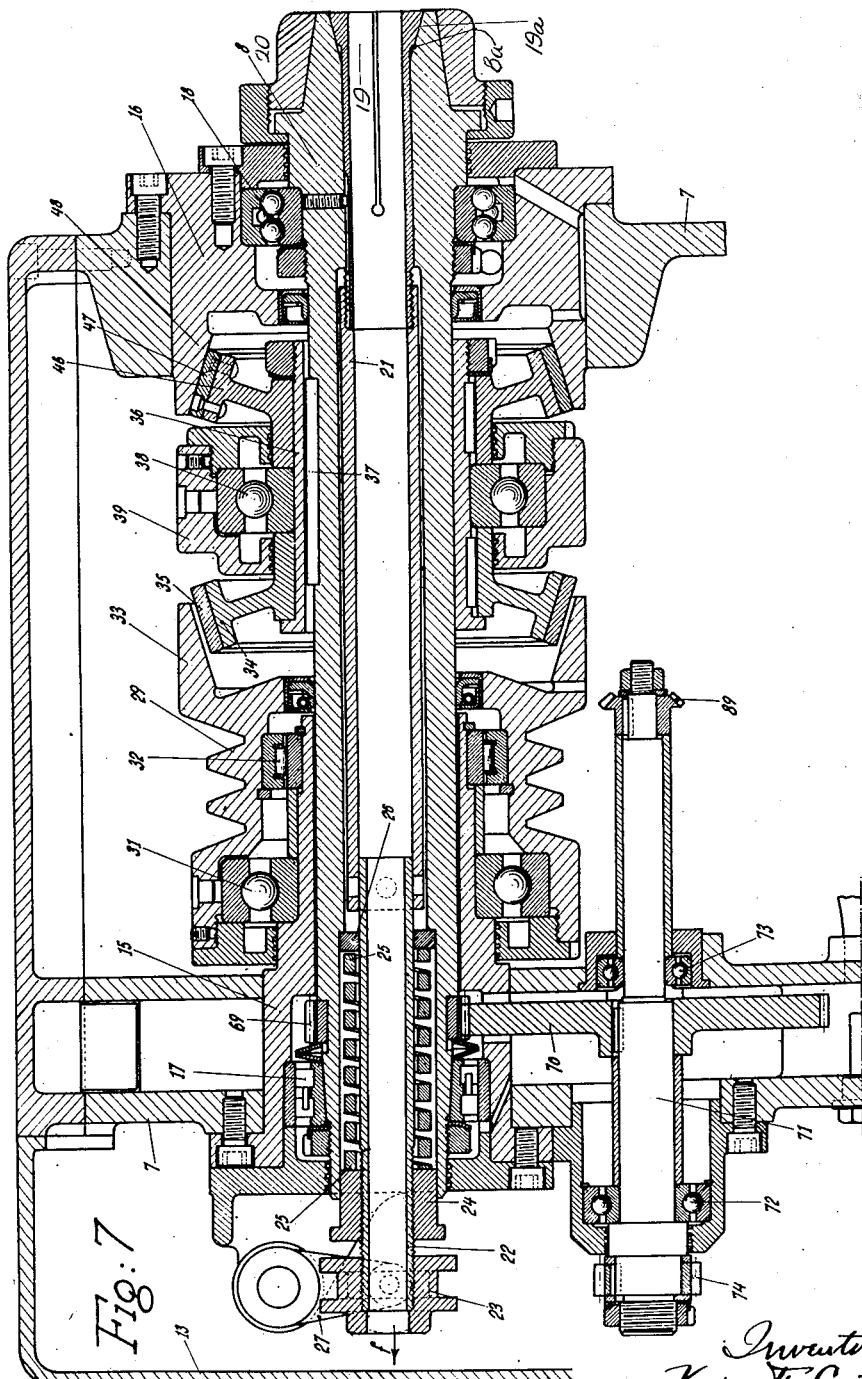

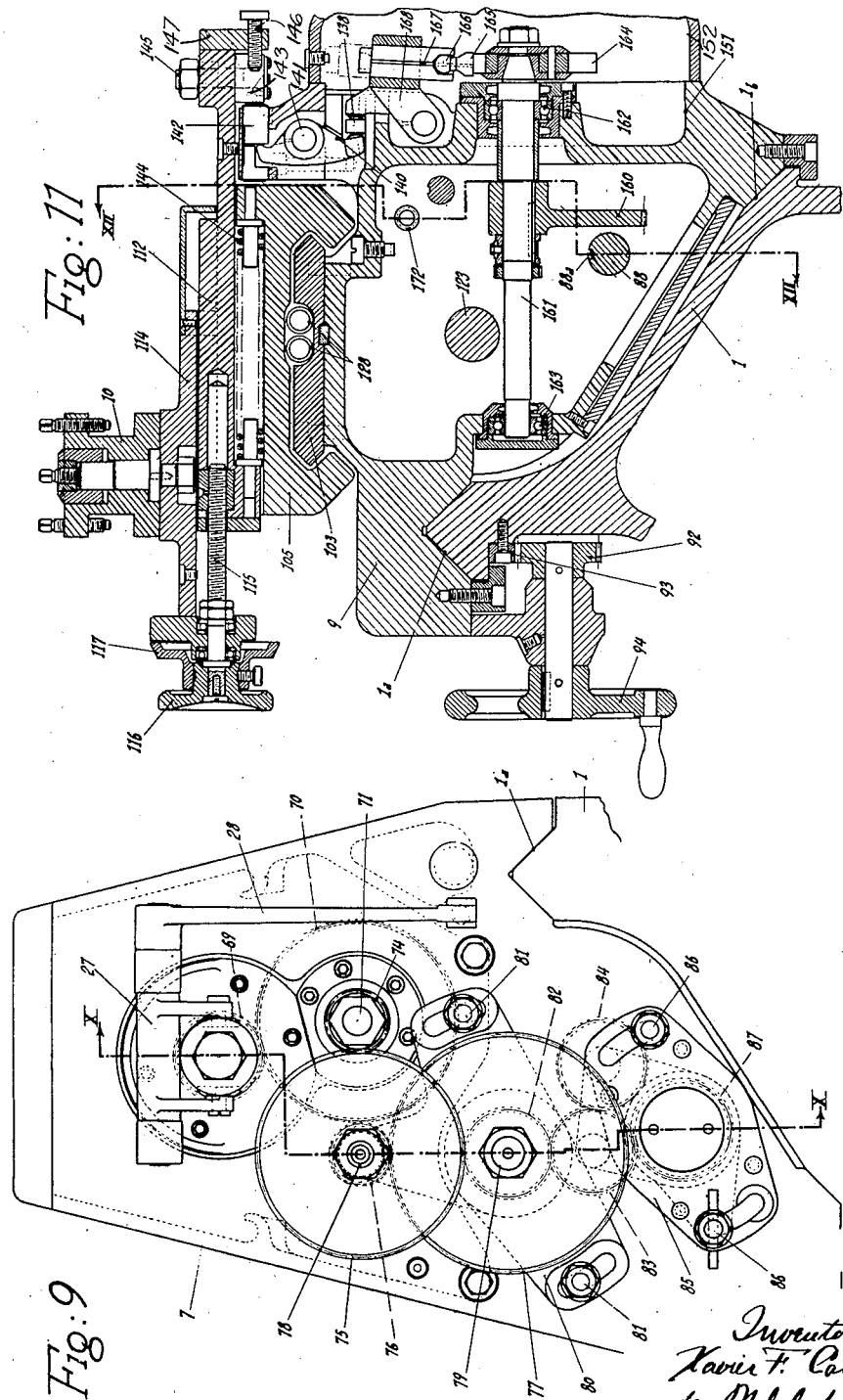

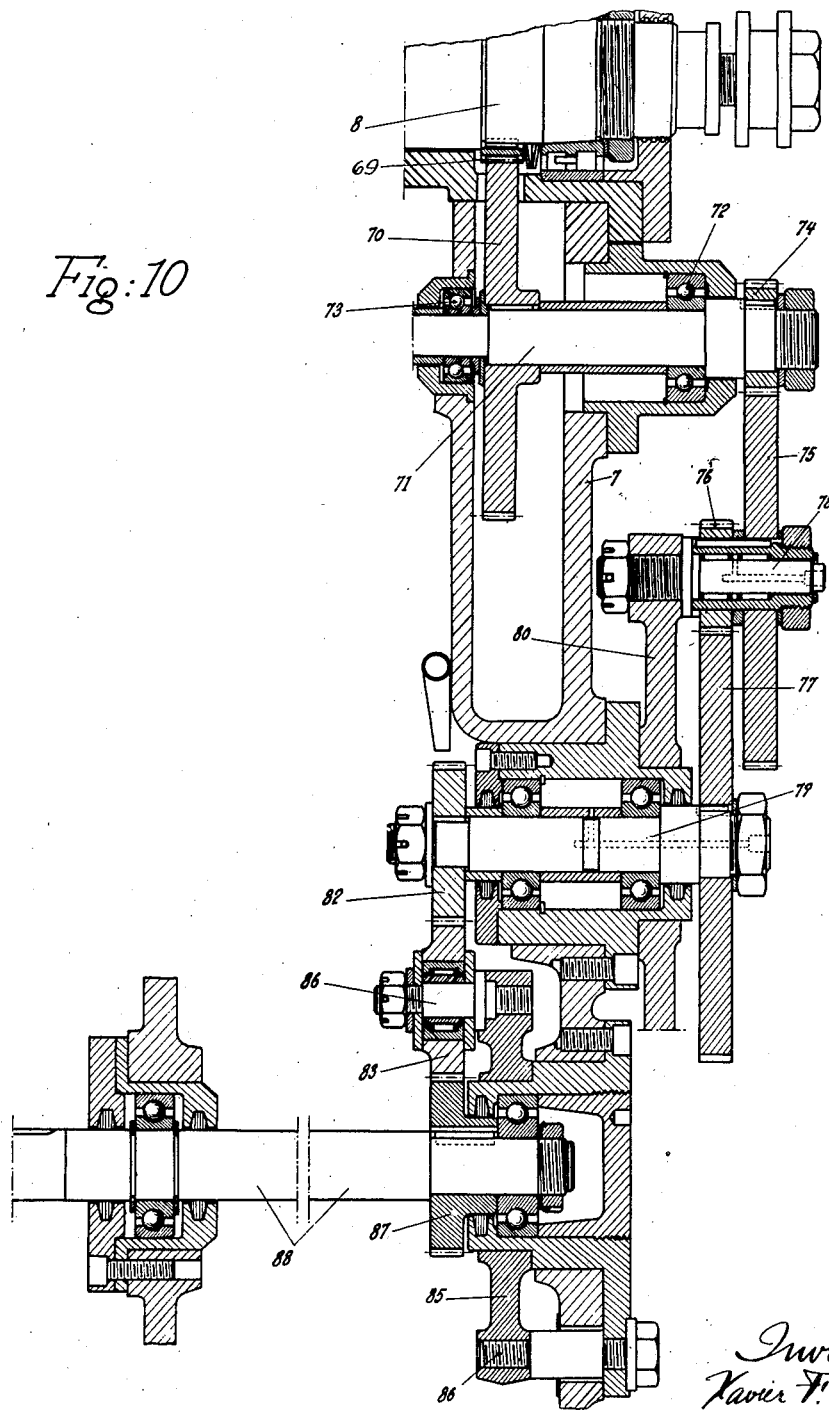
Fig:10

Nov. 27, 1951      X. F. CASTELLI      2,576,570
SCREW MACHINE
Filed Jan. 8, 1946      15 Sheets-Sheet 8
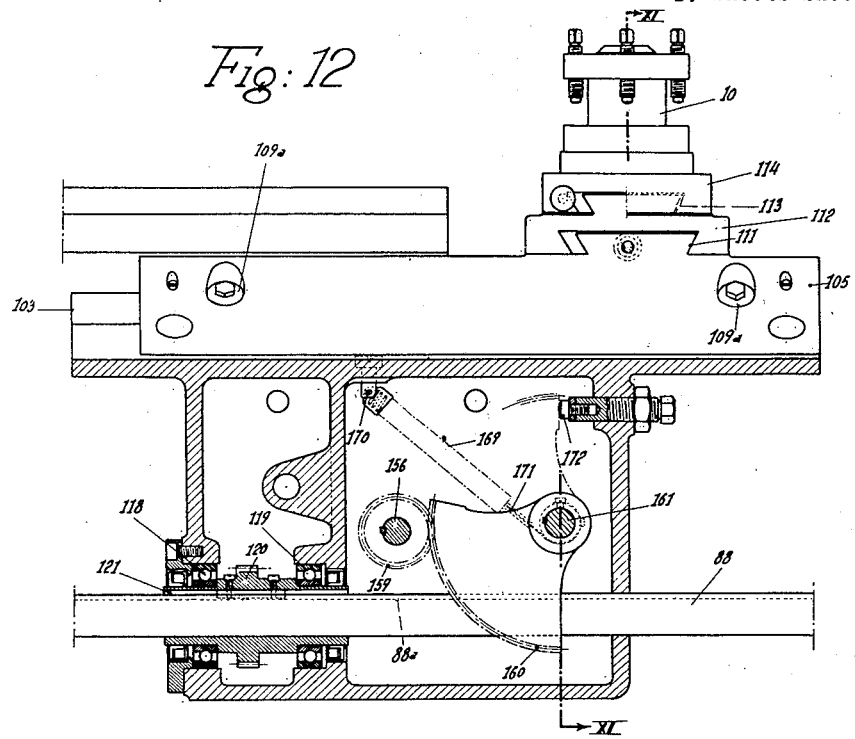
Fig: 12
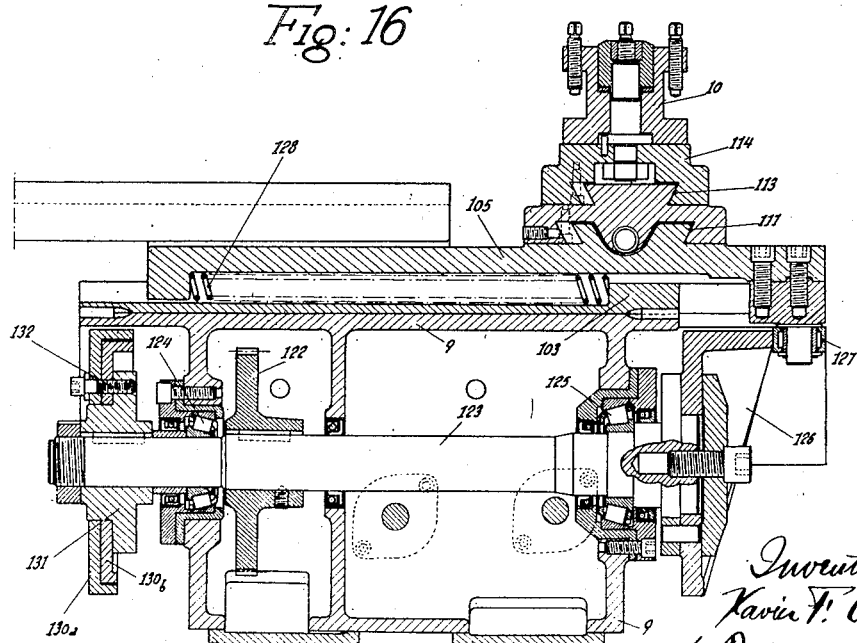
Fig: 16

Nov. 27, 1951 — X. F. CASTELLI — 2,576,570
SCREW MACHINE
Filed Jan. 8, 1946 — 15 Sheets-Sheet 9

Nov. 27, 1951 X. F. CASTELLI 2,576,570
SCREW MACHINE
Filed Jan. 8, 1946 15 Sheets-Sheet 10

Nov. 27, 1951    X. F. CASTELLI    2,576,570
SCREW MACHINE
Filed Jan. 8, 1946    15 Sheets-Sheet 11
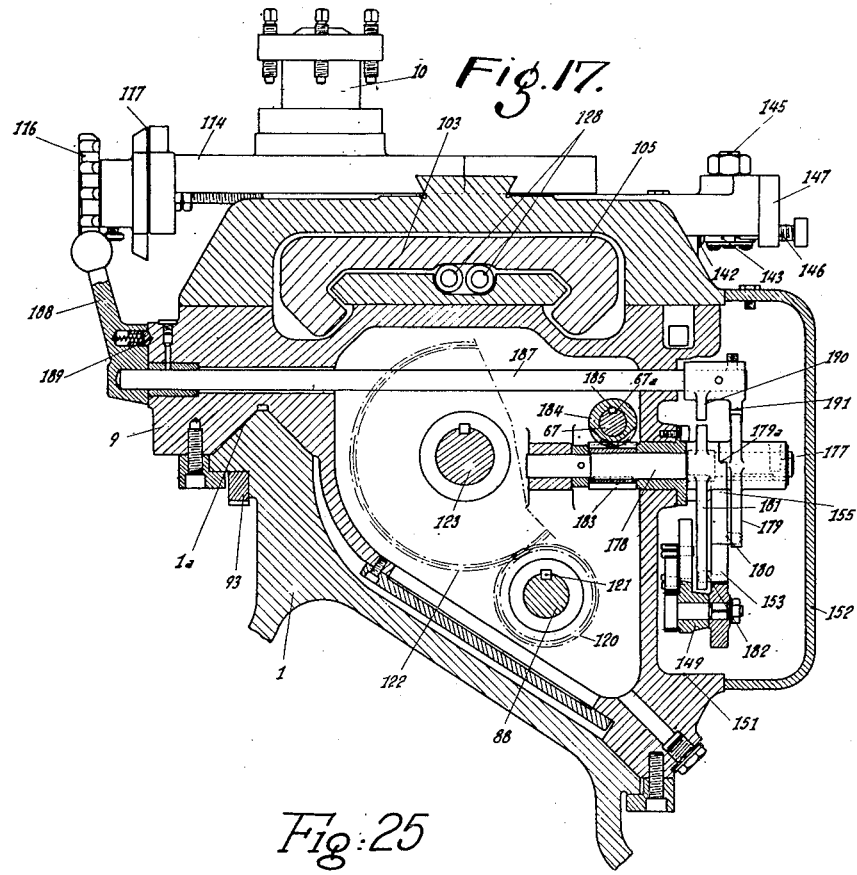

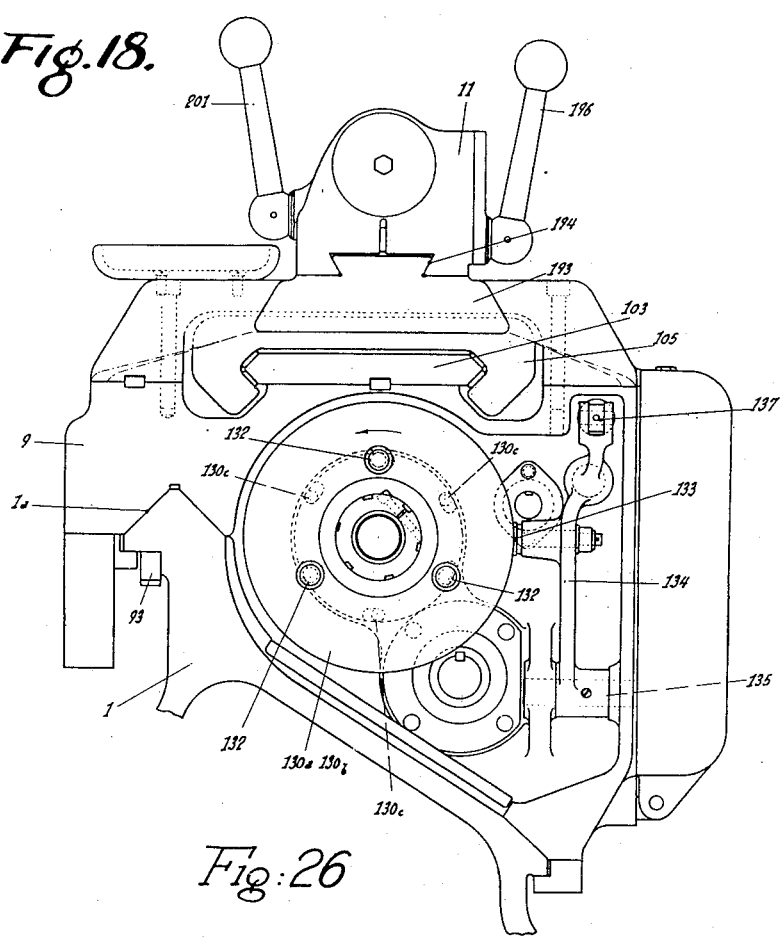
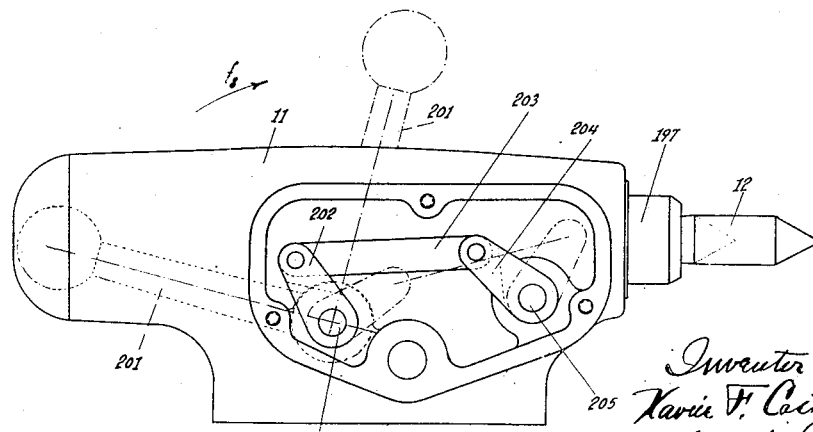

Nov. 27, 1951

X. F. CASTELLI 2,576,570

SCREW MACHINE

Filed Jan. 8, 1946

Nov. 27, 1951  X. F. CASTELLI  2,576,570
SCREW MACHINE

Filed Jan. 8, 1946  15 Sheets-Sheet 14

Inventor
Xavier F. Castelli
by Malcolm W. Fraser
Attorney

Nov. 27, 1951     X. F. CASTELLI     2,576,570
SCREW MACHINE
Filed Jan. 8, 1946     15 Sheets-Sheet 15
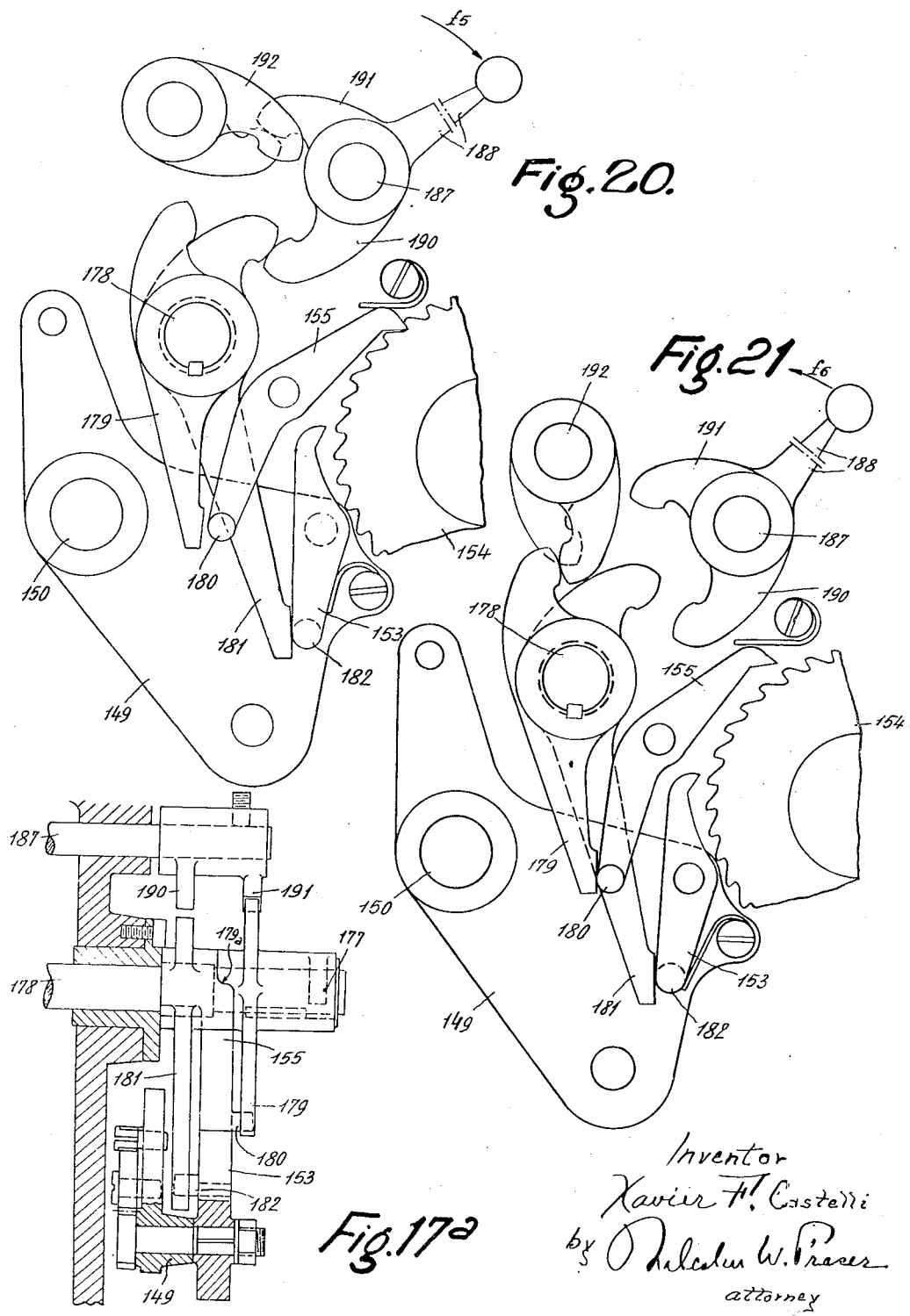

Patented Nov. 27, 1951

2,576,570

UNITED STATES PATENT OFFICE 2,576,570

SCREW MACHINE

Xavier François Castelli, Paris, France, assignor to Societe Cri-Dan, Paris, France Application January 8, 1946, Serial No. 639,773
In France January 9, 1945

9 Claims. (Cl. 10—101)

The present invention has for its object a screw machine of the type including a succession of operations similar to that of a semi-automatic lathe, i. e. first cutting, disengagement of the tool, quick back stroke, forward stroke for the next cutting, second cutting, and so on up to completion of the work, but in which the longitudinal displacement of the tool-holder is controlled by a rotating cam which is moved by the driving spindle for the work piece, whereas the progressive transverse advance of the tool, after each cut, is controlled by another cam also driven by such spindle, the various mechanisms being automatically stopped when the number of cuts selected to perform the screw-cutting has been achieved.

In the known machines of this kind, if the succession of operations is, as previously stated, similar to that of a lathe, the disposition of the movable working parts and of the control parts is however frequently different from the one which is in use on the lathes; it is thus necessary to provide for skilled workers to perform operations for which said machines are designed. On the other hand, with said machines, it is generally possible to perform screw-cuttings which are located at a limited distance from the nose of the driving spindle, the mechanisms which control the longitudinal displacements of the tool-holder and the transverse advance of the tool being mounted on the frame of the machine in close proximity to the spindle and in fixed position with respect to the latter.

An object of this invention is to provide a screw-cutting machine of the kind above cited, the analogy of which to a lathe being extended, not only to the succession of operations, but also to the general disposition of the frame and of the control and working parts carried by said frame, in order to simultaneously profit by the advantages of quick execution, high yield and accuracy which pertain to the screw-cutting machine of the kind referred to.

Another object of this invention is to produce a screw-cutting machine with which it will be possible, not only to perform screw-cuttings on pieces of a great length, but also, as is the case with a lathe, to localize said screw-cuttings at any points of the length of said pieces.

Still another object of this invention is to produce a screw-cutting machine, in which the mechanisms providing the control of the longitudinal displacements of the tool-holder, for the control of the transverse advance of the tool, for the determination of the number of cuttings and for the automatic stopping, are compactly arranged, entirely located outside and under the working area of the tool-holder, and adequately protected while being easily within reach, so as to completely clear said working area and to place the said mechanisms out of reach of collisions and other causes of deteriorations.

Still another object of this invention is to produce a screw-cutting machine in which the control and adjusting mechanisms above referred to are rationally designed, of a simple construction, easily regulated and of a safe operation.

Other characteristics of the invention will appear from the following description, with reference to the annexed drawings which represent, by way of nonlimitative example, an embodiment of a screw-cutting machine working with a tool according to this invention, and in which:

Fig. 1 is an elevation of the machine as a whole.

Fig. 2 is an end view.

Fig. 3 is a plan view.

Fig. 4 is a perspective view of the various parts of the machine, viewed from the side opposite the worker, the frame, casings and supports.

Fig. 5 is a cross-section of the headstock through V—V of Fig. 1.

Fig. 6 is a longitudinal section through VI—VI of Fig. 5.

Fig. 7 is a longitudinal section of the spindle through VII—VII of Figs. 3 and 5.

Fig. 8 is a section of a detail of the control mechanism of the spindle, through VIII—VIII of Fig. 5.

Fig. 9 is an elevation of the set of gears of the headstock and means to reverse the direction of motion.

Fig. 10 is an evolute section through X—X of Fig. 9.

Fig. 11 is a cross-section of the carrier through XI—XI of Fig. 1.

Fig. 12 is a longitudinal section through XII—XII of Fig. 11.

Fig. 16 is a longitudinal section of the carrier through XVI—XVI of Fig. 15.

Fig. 17 is a fourth longitudinal section of the carrier through XVII—XVII of Fig. 1.

Fig. 17a is an enlarged sectional view of the control mechanism for the tool holder;

Fig. 18 is an end view of the carrier, from the end carrying the back-center.

Fig. 19 is an elevation of the carrier, from the end opposite the worker, the casing which encloses control mechanisms of the tool-holder being removed.

Figs. 20 and 21 are two enlarged detail views of the said mechanisms in two different working positions.

Fig. 22 is a section, viewed from above, of another detail, through XXII—XXII of Fig. 19.

Fig. 23 is a section of another detail through XXIII—XXIII of Fig. 19.

Fig. 24 is an analogous section of the detail of Fig. 23 in another position of working.

Fig. 25 is a longitudinal section of the back-center.

Fig. 26 is an elevation of the back-center, viewed from the side opposite the worker, the lateral cover being removed.

Figure 13:
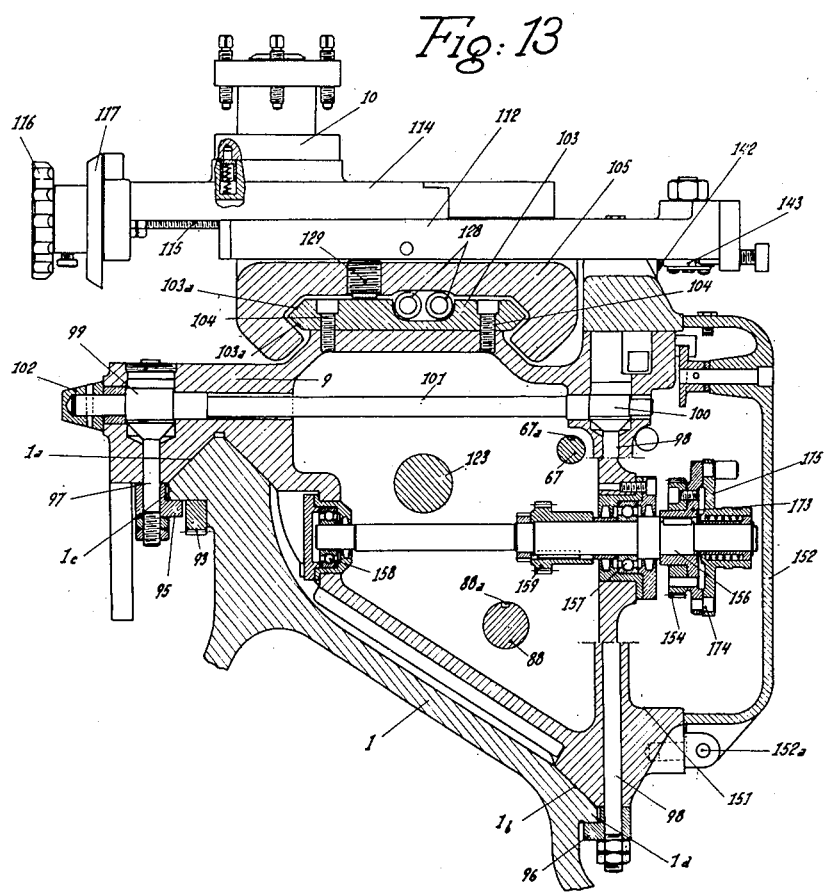
Fig. 13 is another cross-section of the carrier through XIII—XIII of Fig. 1.

The machine shown comprises (Figs. 1, 2 and 3) a hollow frame constituted by two members 1 and 2 mounted upon a base 3 and the upper part 1 of which constitutes a work bed with a prismatic slide bar. Said frame encloses a motor 4 connected by a strap 5 to the intake shaft of a continuous change-speed device 6 through which it controls the different mechanisms of the machine. On the work bed 1 are mounted, on the one hand, a fixed headstock 7 carrying the driving spindle 8 for the work piece and, on the other hand, a carrier 9, stationary during working but longitudinal position of which can be varied; said carrier supports the movable tool-holder 10 and encloses the mechanisms adapted to automatically control the movements of the latter. On the same carrier can further be mounted a back-center 11 the longitudinal position of which can be adjusted and the pointed rod 12 of which is located along the axis of spindle 8. At its end which carries the headstock 7, the frame is closed by a removable casing 13. On the upper periphery of the member 2 of the frame is disposed a chips box 14.

The headstock 7 (Figs. 5 to 10) is constituted by a hollow frame fitted on the prismatic slide-bar 1a of the work bed 1 and bolted on the latter. In said frame are fastened socket-bearings 15—16 (Figs. 6 and 7) in which the spindle 8 is rotatively mounted through ball-bearings such as 17—18 (Fig. 7). The spindle is constituted by a tubular element the nose of which carries inwardly an interchangeable fastening clamp 19 to fasten the piece to be screw-cut and, outwardly, a conical butt 20 to which may be attached, in perfect coaxial relation, any desired mandrel or mounting. The fastening clamp comprises, at its end corresponding to the nose of spindle 8, a conical part 19a to which corresponds a conical boring 8a of said spindle. At the inner end of said clamp is screwed a tubular rod 21 with which telescopes a tube 22 of smaller diameter, the free end of which protrudes from the spindle 8 and carries a collar 23 screwed on it. On the tube 22 is also screwed a sleeve 24 which enters the spindle 8 with a light friction and on which bears a compression spring 25 bearing, at the other end, against a collar 26 fixed inside the spindle. Said spring tends thus to push on the sleeve 24 and consequently the tubes 22 and 21 and the fastening clamp 19 in the direction of the arrow f and so to force the conical part 19a of the clamp against the conical bore 8a of the spindle, allowing thus for the tightening of said clamp. The opening of the clamp 19 to insert the piece to be screw-cut is accomplished by a thrust exerted in the reverse direction on the collar 23, by a fork 27 on which is keyed a lever 28 (Fig. 6) controlled in a manner to be later described, said thrust compressing the inner spring 25 and freeing the conical part 19a of the fastening clamp.

The rotation of the spindle 8 is effected by means of a pulley 29 disposed coaxially of the spindle and connected by V belts 30 with the drive shaft of the continuous change-speed device 6 (Fig. 1). Said pulley 29 is freely mounted on the socket-bearing 15 (Fig. 7) through anti-friction bearings 31—32 and so can rotate independently of the spindle 8. The pulley 29 is integral with a female clutch cone 33 in which can be engaged by a male cone 34 fitted with a friction band 35 and which is a part of a shiftable sleeve 36 adapted to rotate with the spindle 8 through a key 37 and to longitudinally slide on the same. On the sleeve 36 is mounted, through a ball-bearing 38, a ring 39 on which is articulated a control fork 40 (Figs. 5 and 6). On its lower end, the fork 40 comprises a hub 41 through which it rotates about a shaft 42 mounted on the frame 7 of the headstock, at right angles to the geometrical axis of the spindle 8. The hub 41 is fitted with a lever 43 at the end of which is provided a housing 43a; in the latter is housed a spring 44 which bears, at the other end, in another housing 45a provided in a stirrup-shaped lever 45 adapted to rotate about the shaft 42 of the fork 40. It is through said lever 45 and the spring 44 acting on the lever 43 of the fork 40 that the cones 33 and 34 are brought into engagement in a manner which shall be explained below.

The sleeve 36 is also fitted with a braking cone 46 carrying a friction band 47 and adapted to engage, in such conditions to be explained below, with a female cone 48 integral with the socket-bearing 16 to stop rotation of the spindle.

The control of the opening and of the tightening of the clamp 19, and then of the clutch 33—34 to induce rotation of the spindle, is obtained by means of a device which comprises a single control lever 49 (Figs. 1, 4 and 5) mounted on a shaft 50 which rocks in the frame of the headstock 7. Said lever 49 is normally maintained in the vertical position shown by the drawing by means of a spring 51 fixed, on the one hand, to the frame 1 of the machine through an adjustable screw 52, and, on the other hand, to a lever 53 pinned on the shaft 50. The shaft 50 carries a finger 54 positioned opposite one of the arms 55 of a double rock-lever mounted on the shaft 42 of the fork 40 and the other arm 56 of which is connected by an articulated rod 57 to the free end of the lever 28 (Fig. 6). A pin 58 (Fig. 8), fixed to the frame of the headstock, sets limits to the angular movements of the finger 54. The shaft 50 carries also a finger 59 disposed opposite one of the arms 60 of a second double rock-lever mounted on the shaft 42 and on the other arm 61 of which carries a screw 62 by means of which it can exert a thrust on the stirrup-shaped lever 45. The double lever 60—61 is integral with an arm 63 adapted to engage an actuating bolt 64 which vertically slides in a bore 65 of the frame 7 under the action of a knee lever 66 keyed on a shaft 67 adapted to rotate in the bore 65 and which ends inside the carrier 9. The knee lever is urged by a spring 68 which, at all times tends to raise the bolt 64.

The control device above described operates as follows (see also Fig. 4).

In order to open the clamp 19 and place in it the piece to be screw-cut, the lever 49 is rocked in the direction of the arrow $f_1$. By such movement, the finger 54 bears on the arm 55 of the rock-lever 55—56, the arm 56 of which exerts a traction on the rod 57 and then on the lever 28. The latter pushes on the collar 23 through the fork 27, thus determining the compression of the inner spring 25 of the spindle (Fig. 7) and the opening of the clamp 19. The lever 49 being returned to its vertical position of rest after introduction of the piece into the clamp 19, the spring 25 is released and determines by adjustment of the sleeve 24 the tightening of the clamp. By a further rocking of the lever 49 in the direction of the arrow $f_2$ (Figure 4), the finger 59 is caused to bear on the arm 60 of the rock-lever 60—61, the other arm 61 of which, bearing on the stirrup-shaped lever 45 through the screw 62, compresses the coupling spring 44 and effects, by means of the arm 43 and the fork 40, the engagement of the cone 34 with the female cone 33 of the pulley 29. At the end of said movement, the arm 63 of the lever 60—61 is clasped on the bolt 64, so maintaining the preceding parts in a position of engagement.

On its posterior end, the spindle 8 (Fig. 7) carries a pinion 69 through which it transmits its rotation to the mechanisms of the carrier 9. To that end, the pinion 69 meshes with a toothed wheel 70 keyed on a shaft 71 rotating in ball bearings 72—73 mounted on the frame 7 of the headstock. Said shaft 71 carries, on its end located in the casing 13, a pinion 74 which drives a removable outer set of gears 75—76—77 the shafts 78—79 of which are mounted on a support 80 adapted to be locked in the correct meshing position by means of bolts 81. Said gears, together with the pinion 74 also removable, determine the step down ratio between the speed of rotation of the spindle 8 and the speed of the screw-cutting mechanisms carried by the carrier 9. The shaft 79 of the last gear 77 carries, inside the frame 7 of the headstock, a pinion 82 adapted to be put into mesh, at will, with one or the other of two pinions 83—84 mounted on a movable support 85 acting as motion-reversing means in order to produce left or right hand threads and which is maintained in the desired position of rotation by means of locking bolts 86. The two inverting pinions 83—84 cooperate with a last pinion 87 keyed on a longitudinal shaft 88 which ends inside the carrier 9 where it controls, as it will be described later, the movements of the screw-cutting mechanisms. The shaft 71 connected to the spindle 8 carries, on the other hand, inside the headstock 7 (Figs. 5 and 6), a bevel pinion 89 which controls, through a second pinion 90, a tachometer located in a housing 91 fixed on the headstock in front of the worker and which allows checking at each instant the speed of rotation of the spindle.

The carrier 9 (Figs. 11 to 19) consists of a hollow frame fitted, on the one hand, on the prismatic slide-bar 1a of the work bed 1, and, on the other hand, on an inclined surface 1b of the latter, in order that it can slide longitudinally on them to modify its position. Said longitudinal movement is controlled by means of a pinion 92 meshing with a rack 93 fixed under the prismatic slide-bar 1a (Fig. 11) and the rotation of which is controlled by a hand wheel 94 located on the front of the machine. After regulation of its longitudinal position, the carrier can be locked by means of two blocking lugs 95—96 bearing under corresponding rims 1c and 1d of the work bed 1 (Fig. 13) the locking of which is effected through two rods 97—98 on which act two eccentrics 99—100 mounted on a transverse shaft 101 controlled by a lever 102 which is disposed on the front part of the machine.

Figure 14:
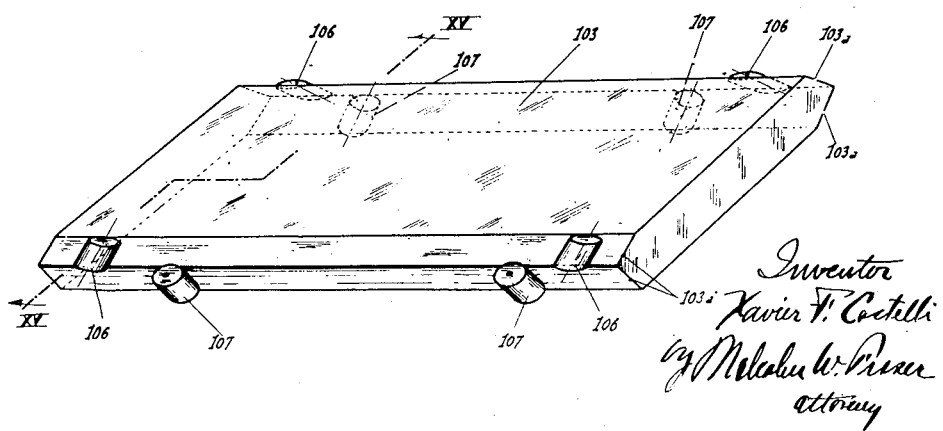
Fig. 14 is a diagrammatic perspective view of the guiding plate of the longitudinal carriage.
Figure 15:
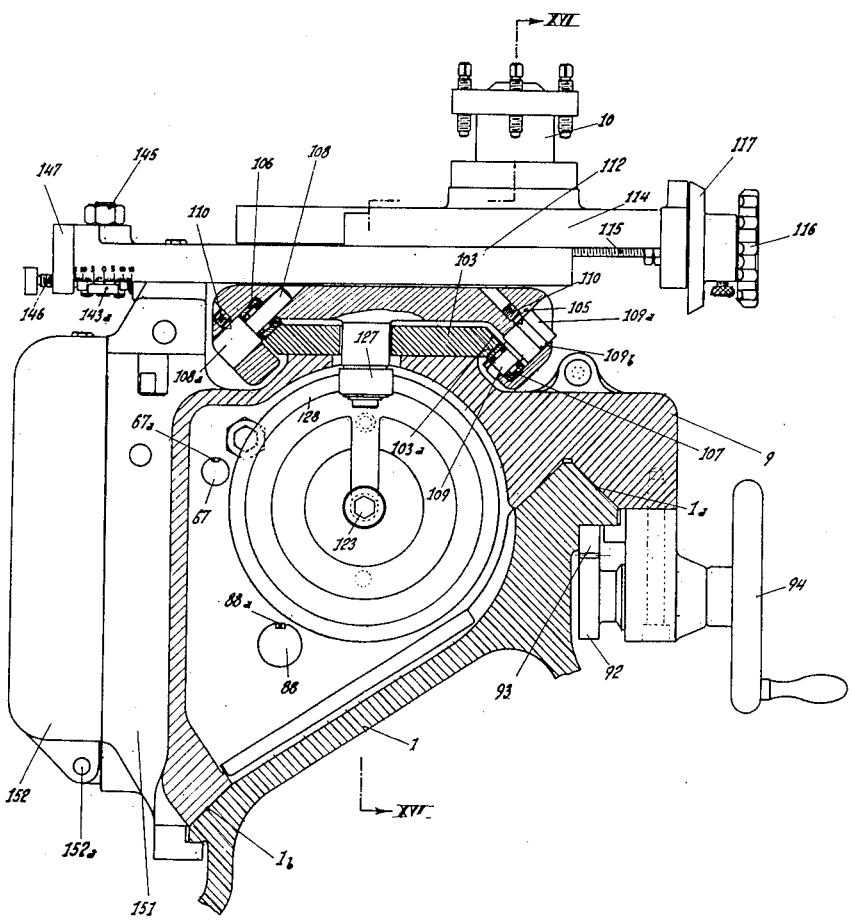
Fig. 15 is a third cross-section of the carrier through XV—XV of Figure 1 and passing through XV—XV of Fig. 14.

The carrier 9 comprises at its upper part a rectangular horizontal plate 103 fixed to it by screws 104, and each longitudinal edge of which is chamfered symmetrically at 103a. On the plate 103 is engaged a longitudinal carriage 105 mounted so as to freely slide on the same with the interposition of four pairs of needle-rollers 106—107 rolling two by two on each of the chamfers 103a (Figs. 14 and 15). The axles 108—109 of the rollers 106—107 are respectively mounted on the carriage 105 through shoulders 108a—109a blocked up on said carriage by set screws 110. In order to allow for a regulation and taking up of the play, the axles 109 of the lower rollers 107 are eccentric with respect to the corresponding shoulders 109a and the latter is fitted with a groove 109b in which penetrates the corresponding screw 110; it is thus possible, by rotating the shoulders 109a, to more or less bring the rollers 107 closer from the chamfer 103a with which they cooperate.

On the longitudinal carriage 105 is mounted, by means of dovetailed slides 111, a movable transverse carriage 112 on which is mounted, likewise by means of dovetailed slides 113, a second transverse carriage 114 carrying the tool-holder turret 10. The displacements of the longitudinal carriage 105 on the plate 103 of the carrier, controlled by a mechanism to be described later, correspond to the longitudinal movements of the tool during the screw-cutting work, whereas the movements of the movable transverse carriage 112 correspond to the movements of transverse feeding and of retraction of the tool. As for the upper transverse carriage 114, normally stationary during the working phase, it is designed to allow adjusting the transverse position of the tool, said adjustment being obtained through a micrometric screw 115 (Fig. 11) screwed into the movable carriage 112 and the rotation of which is controlled by a milled knob 116 and an adjustable vernier 117 carried by the carriage 114.

The shaft 88 above described, which is set in rotation by the spindle 8 through the set of gears mounted in the headstock 7, ends at the lower part of the carrier 9 in which it is carried by ball-bearings such as 118—119 (Fig. 12). Said shaft 88 carries, between the bearings 118—119, a pinion 120 which is made fast with it for rotation by a key 121. The key 121 is engaged in a longitudinal groove 88a cut in the shaft 88 and in which it can freely slide, which allows for the pinion 120 to be moved along the shaft 88 together with the carrier 9 when the longitudinal position of the latter is adjusted. The pinion 120 meshes with a toothed wheel 122 keyed on a shaft 123 which can rotate in bearings 124—125 mounted in the carrier 9 (Figs. 16 and 17). At the end of the shaft 123 opposite the worker is keyed a bell-fashioned cam 126 with the side of which contacts a roller 127, fixed under the corresponding end of the longitudinal carriage 105 (see also Fig. 15). The roller 127 is maintained bearing against the cam 126 by means of two compressed springs 128 disposed between the plate 103 and the carriage 105 and which act to urge the latter in a direction opposite the headstock 7. The cam 126, which is referred to as "pitch-cam;" controls the longitudinal movement of the carriage 105, and consequently of the tool (not shown) mounted on the tool-holder 10 and which determines the maximum length and the pitch of the screw to be cut, account being taken of the rotational speed given by the set of gears interposed between the spindle and the shaft 88. Said cam, which is removable and can be changed according to the desired length and pitch of the screw to be cut, has a profile which comprises: a first helicoidal part which extends, according to the more or less speedy movement to be obtained for the tool, by example along an arc of about 180° or about 240° and which corresponds to the working stroke of the tool; a rectilinear part causing stopping of the carriage 105 during which is effected the disengagement of the tool and a forward stroke of the same having the value of the next cutting; and a second helicoidal part the obliquity of which is in a reverse direction with respect to the first one, and which corresponds to the quick return of the carrage 105 under the action of springs 128.

In order to allow changing the cam 126, if necessary, a screw 129 (Fig. 13) can lock the longitudinal carriage 105 on the carrier. When such a change is to be made, the machine is rotated till the roller 127 is on the upper part of the cam 126, then the carriage 105 is locked through the screw 129, the cam 126 is removed, the new cam is set into place, the machine is again rotated till the lower part of the new cam is opposite the roller 127, and the screw 129 is lightly unscrewed until said roller contacts the said cam.

On the end of the shaft 123 opposed to that carrying the cam 126 are mounted twin cams 130a—130b, encased one in the other, and fixed on a plate 131 made fast to the shaft 123 by means of three screws 132 located at 120° one from the other. On the circumference of said cams, which shall be described below, rolls a roller 133 (Figs. 18 and 19) carried by a lever 134, the lower end of which is mounted on an axle 135 adapted to rotate with respect to the carrier 9; a compressed spring 136 acts on the lever 134 to permanently maintain the roller 133 in contact with said cams. At its upper end, the lever 134 is connected by means of a Cardan joint 137 to a bar 138 which runs in a longitudinal slide 139 provided in the carrier 9; the free end of said bar is fitted with a slope 138a which terminates in a part 138b of less thickness (Fig. 22); said part contacting one of the arms of a rocking lever 140 pivotally mounted on the carrier by means of an axle 141 (Fig. 11). The other arm of the lever 140 bears on a pushing rod 142 which is in contact with a control element 143 fixed on the transverse carriage 112, said pushing rod transmitting to the carriage 112, and thus to the tool, the forward transverse motions against the action of a compressed spring 144 interposed between the longitudinal carriage 105 and the transverse carriage 112 and which tends to drive the latter away from the work.

The control element 143 consists of a wedge, the face of which contacts the pushing rod 142 being perfectly plane, which is pivotally mounted on a vertical axle 145 fixed to the carriage 112 (Figs. 11, 15, 19 and 22). The position of said wedge can be adjusted by means of two screws 146 passing through a plate 147 provided on the corresponding end of the carriage 112; the wedge 143 is fitted with a lateral finger 143a carrying an index and which protrudes out of one edge of the carriage 112 (Figs. 15 and 23) before a graduation carried by the latter. When the wedge 143 is so adjusted that its face contacting the pushing rod 142 is parallel to the longitudinal axis of the machine (Fig. 23), the movement of the tool, during the working phase, is effected along a trajectory which is parallel to the same axis and there is obtained a cylindrical screw-cutting; if, by means of the screws 146, the wedge 143 is obliquely adjusted with respect to said axis (Fig. 24), there is obtained a conical screw-cutting. In lieu of the plane wedge 143, use may be made of a control element of any desired profile, to perform a corresponding screw-cutting work.

The lever 134, controlled by the twin cams 129—130, is connected, on the other hand, through a link 148, to a lever 149 (Fig. 19) pivotally mounted on an axle 150 in a casing 151 provided on the side of the carrier 9 opposite the worker; said casing contains the different mechanisms for controlling the transverse advance of the tool and for adjusting the number of cuts and is laterally closed by a cover 152 pivoted at 152a (Figs. 13 and 15). The lever 149 (see also Fig. 20) carries a pawl 153 which controls a ratchet wheel 154, the rotation of which in the reverse direction is prevented by a stopping pawl 155. The ratchet wheel 154 is keyed on a shaft 156 which is rotatably mounted in anti-friction bearings 157—158 carried by the carrier (Fig. 13). On the shaft 156 is also keyed a pinion 159 which meshes with a curved rack 160 (Figs. 11 and 12) made fast to another shaft 161 rotatably mounted in anti-friction bearings 162—163. At its end located in the casing 151, the shaft 161 carries a variable cam 164 of the type described in my co-pending patent application Serial No. 622,166, filed on October 13, 1945, (now abandoned) for "Process for Controlling the Displacements of a Mechanical Organ Adapted To Be Moved by Translation and Cam for the Carrying Out Said Process," i. e. comprising two eccentrics of an identical eccentric ratio, mounted one upon the other and the angular positions of which with respect to the shaft 161 are adjustable independently one from the other in order to allow varying, on the one hand, the amplitude of the total advance of the tool, and, on the other hand, the ratio between the depth of the first cuts and that of the last cuts. Said cam 164 acts on a pushing rod 165, connected by a ball and socket joint 166 to a sliding bush 167, adjustable in height, fixed on one arm of a pivotally mounted lever 168, the other arm of which contacts the bar 138 previously described, in front of the rocking lever 140. Thus, the cam 164 controls, through the parts 165—167—168—138—140—142—143 and the carriage 112, the progressive advance in depth of the tool.

As hereinbefore described, the oscillatory movement of the lever 134 which controls, on the one hand, the displacement of the sliding bar 138 and, on the other hand, the rocking movement of the lever 149 carrying the pawl 153, is controlled by the twin cams 130a—130b. The outline of said cams is such that, during the longitudinal displacement of the carriage 105 controlled by the first helicoidal part of the pitch-cam 126 and which corresponds to the tool working phase, the lever 134 remains stationary, the tool being maintained in the same transverse advance position; during the subsequent stopping of the carriage 105 corresponding to the first rectilinear part of the cam 126, the lever 134 is displaced in the direction of the arrow $f_3$ (Fig. 19) so as, on the one hand, to bring the thin part 138b of the bar 138 in front of the rocking lever 140 and to determine, under the action of the spring 144, a transverse movement of the carriage 112 towards the worker, thus providing for disengagement of the tool, and, on the other hand, to effect, through the rocking of the lever 149, upward movement of the pawl 153 and thus an angular movement of the ratchet wheel 154 of one tooth, which brings, through the intermediary of the pinion 159, the curved-rack 160 and the variable cam 164 acting as hereinbefore described, the appropriate movement of the tool at the depth which is necessary for the next cutting operation; during the return stroke of the longitudinal carriage 105 (descending part of the cam 126), the lever 134 is moved in the direction of the arrow $f_4$, so as to bring the slope 138a of the bar 138 to act upon the rocking lever 140 and to effect, through the pushing rod 142, the progressive return of the carriage 112 and thus of the tool in the working position, said position being reached when the bar 138 presents its thick part in front of the rocking lever 140. The outline of the twin cams 130a—130b consequently comprises a plane part extending along an arc at least equal to that of the first helicoidal part of the pitch cam 126; a slope corresponding to the plane part of the cam 126; and a slope inclined in an opposite direction and corresponding to the descending part of the cam 126. As the first helicoidal part of the cam 126 can be extended to 180° or 240°, the twin cams 130a—130b, the outlines of which are identical, are adapted to be rotated one with respect to the other over 60° in order to present to the roller 133 of the lever 134, during the action of said helicoidal part, and as the case will be, a plane part of 180° or 240°. To this end, the cam 130b is fitted with six holes 130c spaced 60° from each other (Fig. 18) forming passageways for the three screws 132 connecting it with the cam 129 and the plate 131.

The angular movement of the variable cam 164, which controls the progressive depth advance of the tool, is limited to the angle which corresponds to the working arc of said cam adapted to determine a movement of advance of the tool according to a positive sinusoidal law of variation, in correlation with a mechanism which enables determining at will the number of cuts which the entire advance of the tool must comprise. To this end, a spring 169 fixed, at on end, to a screw 170 fixed to the carrier 9, and, at the other end, to a steel ribbon 171 rolled up round the shaft 161 of the curved-rack 160, tends to permanently return the latter backward, said movement being limited by an adjustable abutment 172 provided on the edge of the carrier. Moreover, on one face of the ratchet wheel 154, is fixed a plate 173 (Fig. 13) carrying a plug 174 which can be engaged, at will, with one of the holes 175a pierced along a circumference in a coaxial plate 175, freely mounted on the shaft 156, each of said holes corresponding to a predetermined number of cuts. The perforated plate 175 carries a plug 176 on the trajectory of which is disposed a lever 177 (Figs. 17 and 19) keyed at the end of a shaft 178 mounted parallelly to the shaft 156 of the ratchet wheel. On the shaft 178 is keyed a second lever 179 with two arms, the lower arm of which is located in front of a projection 180 provided on the stopping pawl 155. Said lever 179 draws along by a claw clutch 179a a third lever 181 mounted on the shaft 178, and the lower arm of which is positioned in front of a projection 182 provided on the pawl 153. The disposition of said parts is such that, as soon as the plug 176 of the plate 175 bears against the lever 177, the levers 179 and 181 respectively are brought into engagement with the projections 180 and 182 of the stopping pawl 155 and pawl 153, raise said two ratchets and clear the ratchet wheel 154 and the perforated plate 175. Through the medium of the spring 169, the curved rack 160 is retracted until it is stopped by the stop 172, so returning, through the intermediary of the shaft 161, the variable cam 164 to its first original position.

The shaft 178 carrying the levers 179 and 181 for disengaging the pawl 153 and stopping pawl 155, carries also (Fig. 17) an helicoidal pinion 183 meshing with a pinion 184 keyed on the shaft 67, the other end of which, located inside the headstock 7, carries the lever 66 controlling the bolt 64 of the clutch. The pinion 184 is made fast for rotation to the shaft 67 through a key 185 which engages a groove 67a cut into said shaft and in which it can freely slide, which allows said pinion 184 to be moved along the shaft 67 together with the carrier 9 when the longitudinal position of the latter is adjusted. When the shaft 178 is angularly moved by the thrust of the plug 176 of the perforated plate 175 acting on the lever 177, the shaft 67 is itself rotated by means of the pinions 183—184 and provides, through the lever 66, for the lowering of the bolt 64, so clearing the lever 63 (Figs. 5 and 6). The latter, urged by a spring 186 adjustable by means of a knob 187, actuates the clutch cone 34 away from the cone 33 of the pulley 29 and engages the braking cone 46 with the stationary cone 48, so automatically stopping the rotation of the spindle 8 and, consequently, the working of the whole of the mechanisms carried by the carrier 9.

Above the shaft 178 is mounted, in the carrier 9, another transverse shaft 187 (Figs. 17 and 19) which extends through the carrier and terminates at the front part of the machine where it carries a control lever 188 adapted to take three positions and fitted with a spring tensioned detent 189, the opposite end portion being disposed inside the casing 151. At the end of said shaft 187 located inside the casing 151, is keyed a lever provided with two arms 190—191 arranged in two different planes. The arm 190 is disposed in front of the upper arm of the lever 181 so that, when the control lever 188 is rotated in the direction of the arrow $f_5$ (Fig. 20), said arm 190 rocks the lever 181 which, acting upon the lug 182 of the pawl 153, moves the latter away from the ratchet wheel 154; the rotation of said latter wheel is thus prevented and the machine runs idle, the tool remaining at the same depth of cut, which allows completing the adjustment of the tool or checking the work after each cut. The arm 191 is disposed in front of a double lever 192 which, when the control lever 188 is rotated in the direction of the arrow $f_6$ (Fig. 21) acts upon the upper arm of the lever 179 and, through the latter and the lever 181, clears the stopping pawl 155 and pawl 153, and, consequently, stops the machine as it is automatically stopped at the end of the work.

Figure 27:
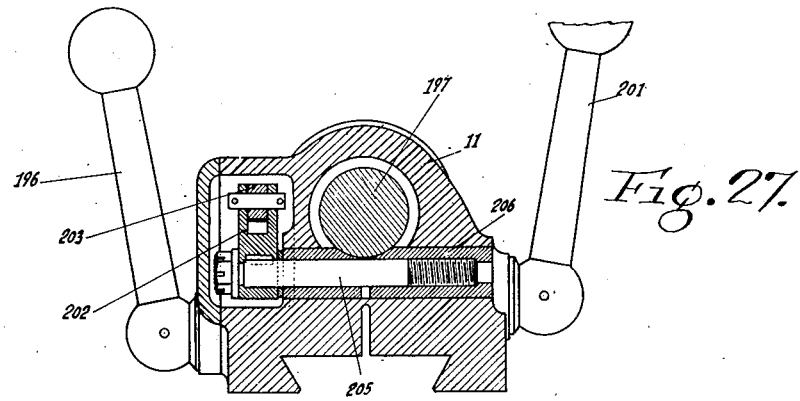
Figs. 27, 28 and 29 are cross-sections through XXVII—XXVII, XXVIII—XXVIII and XXIX—XXIX respectively of Fig. 25.
Figure 28:
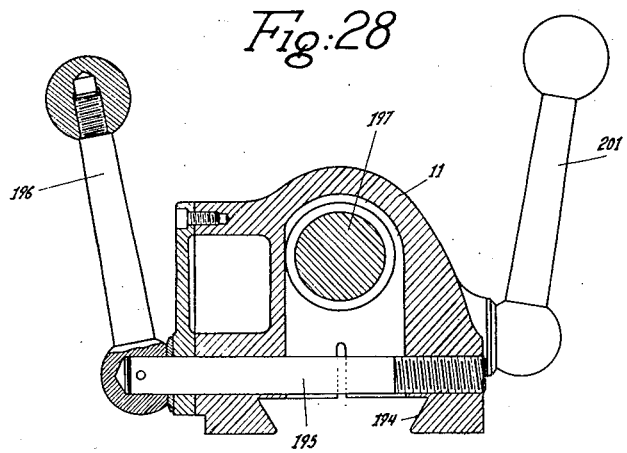
Figure 29:
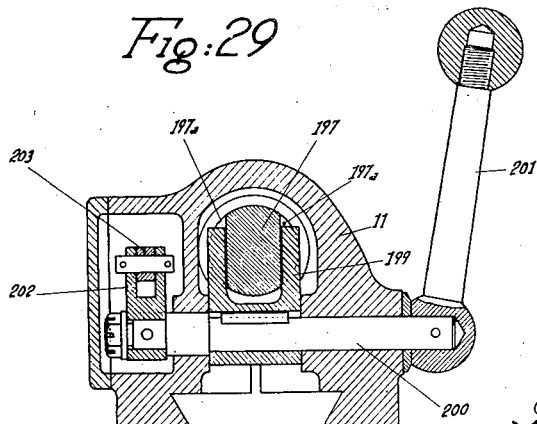

The back-center 11 comprises a hollow frame mounted upon a bridge 193, provided at the end of the carrier 9 opposed to the headstock 7 (Fig. 18), through a dove-tail 194 which can be jammed by means of a screw 195 controlled by a lever 196, in order to lock the back-center in the selected position. In the frame of said back-center (Figs. 25 to 29) is mounted a sliding tube 197 carrying the pointed instrument or center 12 and which is urged outwardly by a compression spring 198 which tends to push outwardly. On the sliding tube 197 are laterally provided two countersunk notches 197a in which are engaged the two branches of a fork 199 keyed on a transverse axle 200 one end of which terminates at one side of the back-tender 11 and carries a control lever 201. The countersunk notches 197a are each rearwardly provided with a slope 197b so disposed that, when the lever 201 is rotated in the direction of the arrow $f_7$ (Fig. 25), the arms of the fork 199 induce a rearward motion of the sliding tube 197 and consequently of the center 12 against the spring 198. The axle 200 is connected, on the other hand, through a lever 202, a link 203 and a second lever 204 (Fig. 26) to a threaded rod 205 on which is screwed a locking block 206 tangentially positioned with respect to the sliding tube 197 (Fig. 27). The disposition is such that, when the lever 201 is rotated in the direction of the arrow $f_8$ (Fig. 26), the fork 199 clears the sliding tube 197 and the center 12, which are urged by the spring 198 toward the piece to be screw-cut, and, at the end of the stroke, the lever 202, the link 203 and the lever 204 induce, through the rotation of the threaded rod 205, a transverse movement of the block 206 through which the latter locks the sliding bush 197.

The machine so designed works as follows (see Fig. 4):

The position of the carrier 9 on the work bed 1 is, at first, adjusted according to the length of the piece to be screw-cut, by unlocking said carrier by means of the lever 102 acting upon the locking rods 95, by moving said carrier through the handwheel 94, and then by locking the same with said lever 102. The position of the back-center 11 on the carrier 9 is also eventually adjusted, after unlocking the lever 196, and it is locked in the selected position by means of the same lever. The clamp 19, corresponding to the diameter of the piece to be worked upon, is mounted in the spindle 8. On the other hand, the pitch cam 126, corresponding to the desired pitch and length of screw-cutting, is mounted on the shaft 123, as previously described; on the headstock 7 is mounted the set of gears 74, 75, 76, 77 adapted to give the desired ratio between the speed of rotation of the spindle 8 and that of the shaft 123, and the relative position of the twin cams 130a—130b is adjusted according as the selected pitch cam comprises an ascending helix extending over 180° or 240°. The plug 174 of the ratchet wheel 154 is engaged in the hole 175a of the plate 175 corresponding to the selected number of cuts, and the variable cam 164 is adjusted according to the depth of the thread to be formed and according to the desired ratio between the first and the last cuts. The transverse position of the tool mounted in the tool-holder 10 is adjusted by means of the milled knob 116 controlling the upper transverse carriage 114.

In order to introduce the piece to be screw-cut into the clamp 19 of the spindle 8, the lever 49 is rotated in the direction of the arrow $f_1$, thereby opening said clamp through the levers 54, 55, 56, the rod 57, the lever 28, the fork 27 and the sliding collar 23 which compress the inner spring 25 of the spindle 8 (Fig. 7). The piece to be screw-cut being set into place in the clamp 19, the lever 49 is returned to its center position, which closes said clamp, as above described and, consequently, the tightening of said piece. The center 12 of the back-center 11 is, eventually, engaged against the other end of said piece, by rotating in the direction of the arrow $f_8$ the lever 201 previously pulled in its position of disengagement by a movement in the direction of the arrow $f_7$. Then, the machine is thrown into gear, by rotating the lever 49 in the direction of the arrow $f_2$, said rotation bringing the cone 34 into gear with the female cone 33 of the pulley 29 through the levers 59—60—61, the fork 45, the clutching spring 44 (Fig. 6), the arm 43 and the fork 40. At the end of that operation, the lever 63 comes into engagement with the locking bolt 64 pushed upwardly by the lever 66 tensioned by the spring 68, locking thus the whole in the position of "throw into gear."

Through the shaft 88 and the gears 120—122, the shaft 123 is rotated and the pitch-cam 126 determines, through the roller 127, the to-and-fro motion of the longitudinal carriage 105 and, consequently, of the tool along the piece to be screw-cut, with a stop of said carriage at each end of stroke, at the advance (corresponding to the effective cut) and at the return. Correlatively to said movement, the twin cams 130a—130b, carried by the same shaft 123, effect, through the roller 133, at the end of the forward stroke of the carriage 105, the movement of the lever 134 in the direction of the arrow $f_3$, from which results, on the one hand, by reason of the rocking of the rocking lever 140 allowed by the slope 138a of the bar 138, the return of the transverse carriage 112 toward the worker under the action of the spring 144 and therefore the clearing of the tool and, on the other hand, by reason of the rocking of the lever 149, the upward movement of the pawl 153 and a displacement of one tooth of the ratchet wheel, bringing about an angular movement of the variable cam 164 which results in turn, by moving the parts 165—167—168—138—140—142—143, in additional transverse feeding of the tool for the next cutting. During the back-stroke of the longitudinal carriage 105, the twin cams 130a—130b effect the movement of the lever 134 in the direction of the arrow $f_4$, from which results, through the slope 138a of the bar 138, the rocking lever 140 and the pushing rod 142, the progressive return of the transverse carriage 112 to the position of working, after which the longitudinal carriage 105 is moved anew through the action of the pitch-cam 126 to perform the next cutting.

Such movements are repeated until the desired number of cuts has been performed. At this moment, the plug 176 of the perforated plate 175 raises the lever 177 and brings, through the levers 179—181, the successive disengagement of the stop and impulse stopping pawl 155 and pawl 153, so liberating the plate 175 and the variable cam 164 which are returned to their first position by the spring 169 acting on the shaft 161, whereas the helicoidal gears 184—185, operating the longitudinal shaft 67, determine in the heatstock 7 the downward movement of the lock 64, so liberating the lever 61 and consequently the lever 43 which, urged by the braking spring 186, disengages the cone 35 from the cone 33 and engages the braking cone 46 in the stationary female cone 48, thus stopping the spindle 8 and the different screw-cutting mechanisms, and returning the same to the starting position for a new cycle of working.

If it is desired, for any reasons, to stop the machine during the working cycle, the lever 188 is rotated in the direction of the arrow $f_6$, through which movement the arm 191 acts, through the medium of the rocking lever 192, on the levers 179, 181 controlling the disengagement of the stopping pawl 155 and pawl 153. As indicated above, the rotation of the lever 188 in the direction of the arrow $f_5$ brings the finger 190 acting upon the lever 181 which results in the disengagement of the pawl 153 only and the machine runs idle, i. e. without an advance of the tool at the end of each stroke of the longitudinal carriage 105.

When the machine is automatically stopped at the end of the working cycle, the center 12 is cleared, if necessary, from the screw-cut piece by rotating the lever 201 of the back-center in the direction of the arrow $f_7$, the clamp 19 is released by rotating the lever 49 in the direction of the arrow $f_1$ and the screw-cut piece is removed from the machine. The setting into place of a new piece and the screw-cutting of the same are obtained by the cycle of operations above described.

In case of pieces of great length, of which the disengagement from the spindle cannot be obtained by the mere action of the back-center 11, the carrier 9 is unlocked by means of the lever 102 acting on the locking rods 95 and is removed from the nose of the spindle 8 by sliding it on the work-bed 1. When another piece is set into place, the carrier is returned to its working position determined by an adjustable stop 207 provided to this end on a support 208 fixed on the body of the head stock 7 (see also Fig. 1), then the carrier is locked again by means of the lever 102. Said mechanism can be used, in similar conditions, to disengage the tool in case of inner screw-cuttings.

What I claim is:

1. A screw machine comprising, in combination, a frame, a stationary headstock at one end of said frame, a driving spindle for the work piece rotatively mounted in said headstock, clutching and breaking means for said spindle mounted in said headstock, a set of stepdown gears with a reverse motion mechanism connected with said spindle and mounted in said headstock, a work bed secured to said frame, a slide bar disposed parallelly to the axis of said spindle and located upon said work bed, a carrier mounted on said slide bar for movement along the same, means for blocking said carrier on said slide bar in any selected position, a tool-holder mounted on said carrier, means on the carrier for imparting to said tool-holder to and fro movement parallelly to the axis of said spindle, means on the carrier for imparting to said tool-holder in timed relation to said to and fro movement a progressive advancing movement at right angle to the axis of the spindle, and means enabling adjustment of the number of the to and fro movements of the tool-holder and automatically stopping of the latter when the selected number has been achieved, the whole of the control and adjusting means of the movements of said tool-holder and of the means which determine the automatic stoppage of said tool-holder being mounted on said carrier and the said means being connected with the set of gears and with the clutching and braking means mounted in the said stationary headstock by means of shafts fitted with sliding key ways allowing them to follow the longitudinal movements of said carrier on the slide bar while remaining rotatively connected with said shafts.

2. A screw machine as claimed in claim 1, comprising manually operated rack and pinion means for moving said carrier to a selected position on said slide bar.

3. A screw machine as claimed in claim 1, in which the carrier blocking means includes a rod on the carrier, a blocking lug on said rod bearing against the work bed, a shaft on said carrier arranged transversely to said rod, an eccentric on said shaft, abutment means on said rod for said eccentric to effect longitudinal movement of said rod for actuating said lug to and from binding engagement with the work bed, and means to rock said shaft.

4. A screw machine according to claim 1 comprising an adjustable stop mounted on the stationary headstock for limiting the movement of the carrier towards said headstock.

5. A screw machine comprising, in combination, a frame, a stationary head stock at one end of said frame, a driving spindle for the work piece rotatably mounted in said head stock, clutching and braking means for said spindle mounted in said head stock, a set of step-down gears with a reverse motion mechanism connected with said spindle and mounted in said head stock, a work bed secured to said frame, a slide bar mounted on said work bed and arranged in parallel relation to the axis of said spindle, a carrier movable along said slide bar, means for blocking said carrier in any selected position on said slide bar, a first carriage mounted on said carrier for movement in directions parallel to the spindle axis, resilient means interposed between said first carriage and carrier for urging said first carriage away from said head stock, a roller mounted on the lower part of said first carriage, a first shaft fixed to one of said step-down gears and terminating in the lower part of said carrier, a second shaft mounted in said carrier and rotatably connected to said first shaft, a cam rotatable with said second shaft and cooperating with said roller to move said first carriage against the action of said resilient means, means to impart to and fro movement to said first carriage, a second carriage mounted on said first carriage for movement in a direction at right angles to the spindle axis, and a tool holder movable with said second carriage.

6. A screw machine comprising, in combination, a frame, a stationary head stock at one end of said frame, a driving spindle for the work piece rotatably mounted in said head stock, clutching and braking means for said spindle mounted in said head stock, a set of step-down gears with a reverse motion mechanism connected with said spindle and mounted in said head stock, a work bed secured to said frame, a slide bar mounted on said work bed and arranged in parallel relation to the axis of said spindle, a carrier movable along said slide bar, means for blocking said carrier in any selected position on said slide bar, a first carriage mounted on said carrier for movement in directions parallel to the spindle axis, resilient means interposed between said first carriage and carrier for urging said first carriage away from said head stock, a roller mounted on the lower part of said first carriage, a first shaft fixed to one of said step-down gears and terminating in the lower part of said carrier, a second shaft mounted in said carrier and rotatably connected to said first shaft, a cam rotatable with said second shaft and cooperating with said roller to move said first carriage against the action of said resilient means, means for blocking said first carriage on said carrier, means to impart to and fro movement to said first carriage, a second carriage mounted on said first carriage for movement in a direction at right angles to the spindle axis, and a tool holder movable with said second carriage.

7. A screw machine comprising, in combination, a frame, a stationary head stock at one end of said frame, a driving spindle for the work piece rotatably mounted in said head stock, clutching and braking means for said spindle mounted in said head stock, a set of step-down gears with a reverse motion mechanism connected with said spindle and mounted in said head stock, a work bed secured to said frame, a slide bar mounted on said work bed and arranged in parallel relation to the axis of said spindle, a carrier movable along said slide bar, means for blocking said carrier in any selected position on said slide bar, a first carriage mounted on said carrier for movement in directions parallel to the spindle axis, means to impart to and fro movements to said first carriage in a direction parallel to said spindle axis, a second carriage movable on said first carriage at right angles to the spindle axis, a casing on said carrier provided with a lateral aperture in the face thereof, a movable cover for said casing, and means within said casing to predetermine the number of to and fro movements of said first carriage and to automatically stop said first carriage when the selected number of movements has been reached.

8. A screw machine comprising, in combination, a frame, a stationary head stock at one end of said frame, a driving spindle for the work piece rotatably mounted in said head stock, clutching and braking means for said spindle mounted in said head stock, a set of step-down gears with a reverse motion mechanism connected with said spindle and mounted in said head stock, a work bed secured to said frame, a slide bar mounted on said work bed and arranged in parallel relation to the axis of said spindle, a carrier movable along said slide bar, means for blocking said carrier in any selected position on said slide bar, a first carriage mounted on said carrier for movement in directions parallel to the spindle axis, means to impart to and fro movements to said first carriage in a direction parallel to the spindle axis, a second carriage movable on said first carriage in a direction at right angles to said spindle axis, resilient means interposed between said first and second carriages, a movable pushing rod connected to said second carriage, a rotatable cam engaging said pushing rod for progressively advancing said second carriage in a direction opposed to the action of said resilient means, a ratchet wheel connected to said cam, ratchet means cooperating with said ratchet wheel, and means associated with said to and fro moving means for governing the operation of said ratchet means thereby to effect step by step rotation of said ratchet wheel and of said cam before each to and fro movement of said first carriage and said pushing rod to effect the return movement of said second carriage under the action of said resilient means at the end of each to and fro movement of said first carriage.

9. A screw machine comprising, in combination, a frame, a stationary head stock at one end of said frame, a driving spindle for the work piece rotatably mounted in said head stock, clutching and braking means for said spindle mounted in said head stock, a set of step-down gears with a reverse motion mechanism connected with said spindle and mounted in said head stock, a work bed secured to said frame, a slide bar mounted on said work bed and arranged in parallel relation to the axis of said spindle, a carrier movable along said slide bar, means for blocking said carrier in any selected position on said slide bar, a first carriage mounted on said carrier for movement in directions parallel to the spindle axis, means to impart to and fro movements to said first carriage in a direction parallel to the spindle axis, a second carriage movable on said first carriage in a direction at right angles to said spindle axis, resilient means interposed between said first and second carriages, a movable pushing rod connected to said second carriage, a rotatable cam engaging said pushing rod for progressively advancing said second carriage in a direction opposed to the action of said resilient means, a ratchet wheel connected to said cam, ratchet means cooperating with said ratchet wheel, means associated with said to and fro moving means for governing the operation of said ratchet means thereby to effect step by step rotation of said ratchet wheel and of said cam before each to and fro movement of said first carriage and said pushing rod to effect the return movement of said second carriage under the action of said resilient means at the end of each to and fro movement of said first carriage, a plate coaxial with said ratchet wheel, means for varying the relative angular position of said plate relative to said ratchet wheel with respect to the desired number of to and fro movements of said first carriage, a finger fixed to said plate, means controlled by said finger to effect disengagement of said ratchet means from said ratchet wheel when the desired number of to and fro movements of said first carriage has been reached and simultaneously control the unclutching and braking means of said spindle, and resilient means urging said cam to its starting position.

XAVIER FRANÇOIS CASTELLI.

REFERENCES CITED

The following references are of record in the file of this patent:

UNITED STATES PATENTS

| Number | Name | Date |
|---|---|---|
| 214,587 | Rogers | Apr. 22, 1879 |
| 2,187,227 | Flanders | Jan. 16, 1940 |
| 2,192,888 | Blazek | Mar. 12, 1940 |
| 2,204,441 | Ogilvie | June 11, 1940 |